United States Patent [19]

Kimmell

[11] Patent Number: 5,359,913

[45] Date of Patent: Nov. 1, 1994

[54] AUTOMOTIVE BRAKE LATHE BOOT PROTECTOR

[76] Inventor: Richard L. Kimmell, 13907 Emir Ave., Sylmar, Calif. 91342

[21] Appl. No.: 43,026

[22] Filed: Apr. 5, 1993

[51] Int. Cl.$^5$ .......................... B23B 5/04; B23B 25/04
[52] U.S. Cl. .......................... 82/112; 82/152; 29/DIG. 56; 29/DIG. 59
[58] Field of Search ............. 82/112, 152, 158, 901; 29/DIG. 56, DIG. 59, DIG. 60, DIG. 94

[56] References Cited

U.S. PATENT DOCUMENTS

| 3,590,673 | 7/1971 | Foll et al. | 82/11 |
|---|---|---|---|
| 3,640,212 | 2/1972 | Friedman | 101/7 |
| 3,710,661 | 1/1973 | Mitchell | 82/112 |
| 4,178,819 | 12/1979 | Mahon | 82/112 |
| 4,242,019 | 12/1980 | Roch | 409/185 |
| 4,510,828 | 4/1985 | Bogaerts et al. | 82/112 |
| 4,514,936 | 5/1985 | Hurtado | 51/270 |
| 4,523,499 | 6/1985 | Aldridge | 82/112 |

Primary Examiner—William E. Terrell

[57] ABSTRACT

A boot guard for shielding the protective extensible bellows or boot of automotive brake lathes from being torn by tools used in the final surfacing operations on brake parts. The guard is formed by a partial enclosure attached to the lathe slip ring with screws, outside of the lathe boot, moving with the lathe spindle as it extends and retracts. It is guided and radially located by a guide pin extending from the body of the lathe through a guide slot in the enclosure.

9 Claims, 3 Drawing Sheets

AUTOMOTIVE BRAKE LATHE BOOT PROTECTOR

BACKGROUND OF THE INVENTION (1) Field of the Invention

Automotive brake maintenance lathes such as those manufactured by Ammco are fitted with expandable rubber or plastic bellows which serve to prevent the entry of cutting debris, dust dirt and grit from their operation into the rotating machinery of the lathe. These bellows are soft and vulnerable to other tools, such as grinding wheels, which are used in conjunction with the lathe in normal final, non-directional surfacing operations. These tools are often applied to parts held on the shaft of the lathe, such as brake disks, in order to impart the recommended swirl pattern to their surface. In such operations there is a danger that the wheel, which is hand held, will slip off the part being refinished, and will cut the above mentioned bellows or boot, thereby compromising its integrity and ability to shield the machine from damaging materials.

Repairs made necessary by the entry of such materials are costly both in terms of the labor and replacement parts costs, poor and inaccurate operation of the precision machine, and in terms of down-time of a productive machine.

(2) Description of the Prior Art

While other inventions have confined the dust and particulates resulting from the function of a brake lathe so as to protect the user from their harmful effects, as in U.S. Pat. No. 4,514,936 issued to Hurtado, the prevention of damage to the machine has been limited to a protective expandable boot which is not protected from the sharp or abrasive tools and cutters used in normal lathe operations.

SUMMARY

It is a primary object of the present invention to prevent the cutting or rupture of the protective expandable boot or bellows of an automotive brake maintenance lathe by the action of the cutting and/or grinding tools or machines used in conjunction with the lathe.

It is a further object to prevent the entry of abrasive particles into the rotating lathe machinery itself through any breaches in the boot or bellows.

It is yet a further object of the present invention to reduce operating costs by avoiding the need for maintenance and replacement of the rotating parts of the lathe.

It is a further object to maintain the accuracy of the lathe.

A still further object is to increase the life span of the lathe through enhanced cleanliness and reduced wear.

It is still a further object is to increase the speed of operation of the lathe since the operator does not have to exercise the same degree of care with a machine protected by the invention as he does with an unprotected lathe.

It is still a further object to permit simple installation with simple tools.

These and other objects are achieved in the present invention by a shield or guard which is adapted to partially cover the expandable boot or bellows which seals the rotating components of a brake lathe from the entry of dirt and abrasive debris. This cover is generally cylindrical and concentric with the spindle of the lathe. It is adapted to be screwed to the adapter ring of the lathe with a plurality of screws.

The partially cylindrical guard is open at the bottom and at the rear, and is free to slide over the expandable boot and the main housing of the lathe so as to provide continuous protection to the boot as the spindle extends from and retracts into the main housing. The guard is provided with a slot or guide along its length and parallel to the spindle so arranged as to engage a guide pin protruding radially from the casting of the lathe. This arrangement guides the movement of the guard and insures its proper alinement to protect the boot.

DESCRIPTION OF THE PREFERRED EMBODIMENT

Figure 1:
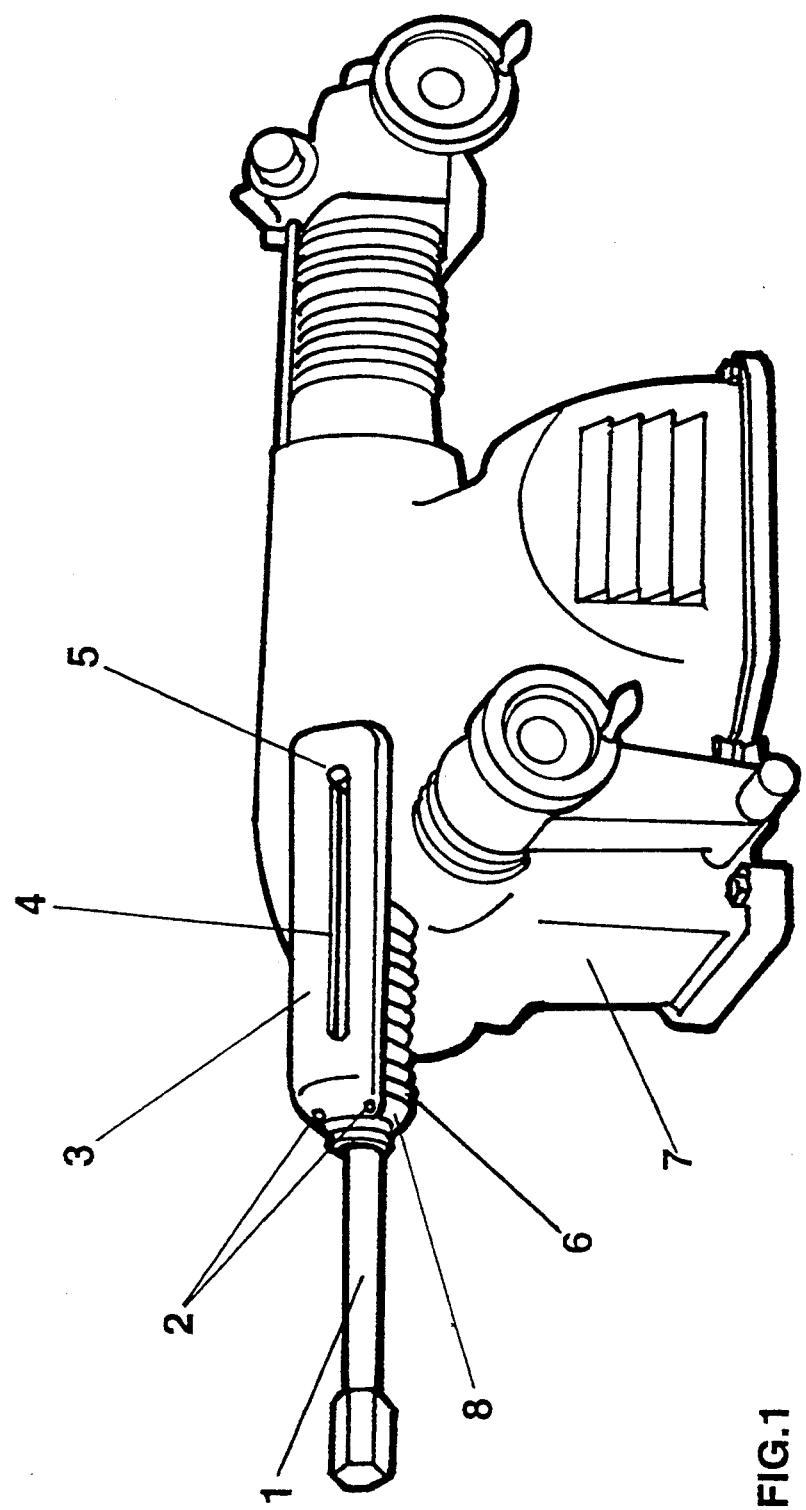
FIG. 1 is a perspective view of the invention installed on a brake maintenance lathe, protecting the expandable boot of the lathe.

Referring to FIG. 1, the brake lathe includes a body casting 7 forming a motorized mount for the lathe shaft arm or arbor extending therefrom. The lathe shaft arm includes a rotatable spindle portion 1 received in a non-rotatable sleeve portion. Boot Guard 3 is installed by means of two screws 2 to a slip ring at the outer or distal end of tile lathe boot 6. The slip ring is brass and is part of the lathe. The Boot or bellows Guard 3 extends over boot and a part of the body casting 7 of the lathe, and as the spindle 1 is extended and retracted from the body 7, the boot extends and retracts. The Boot Guard 3 moves with the slip ring 8, being guided and maintained in its radial orientation by the guide pin 5 sliding in the guide slot 4. Thus at every degree of extensions, the boot 6 is under the Boot Guard 3, and is protected from being cut or worn away. The guide pin 5 is installed in the body casting by simply drilling a hole in the casting and inserting the pin.

Figure 2:
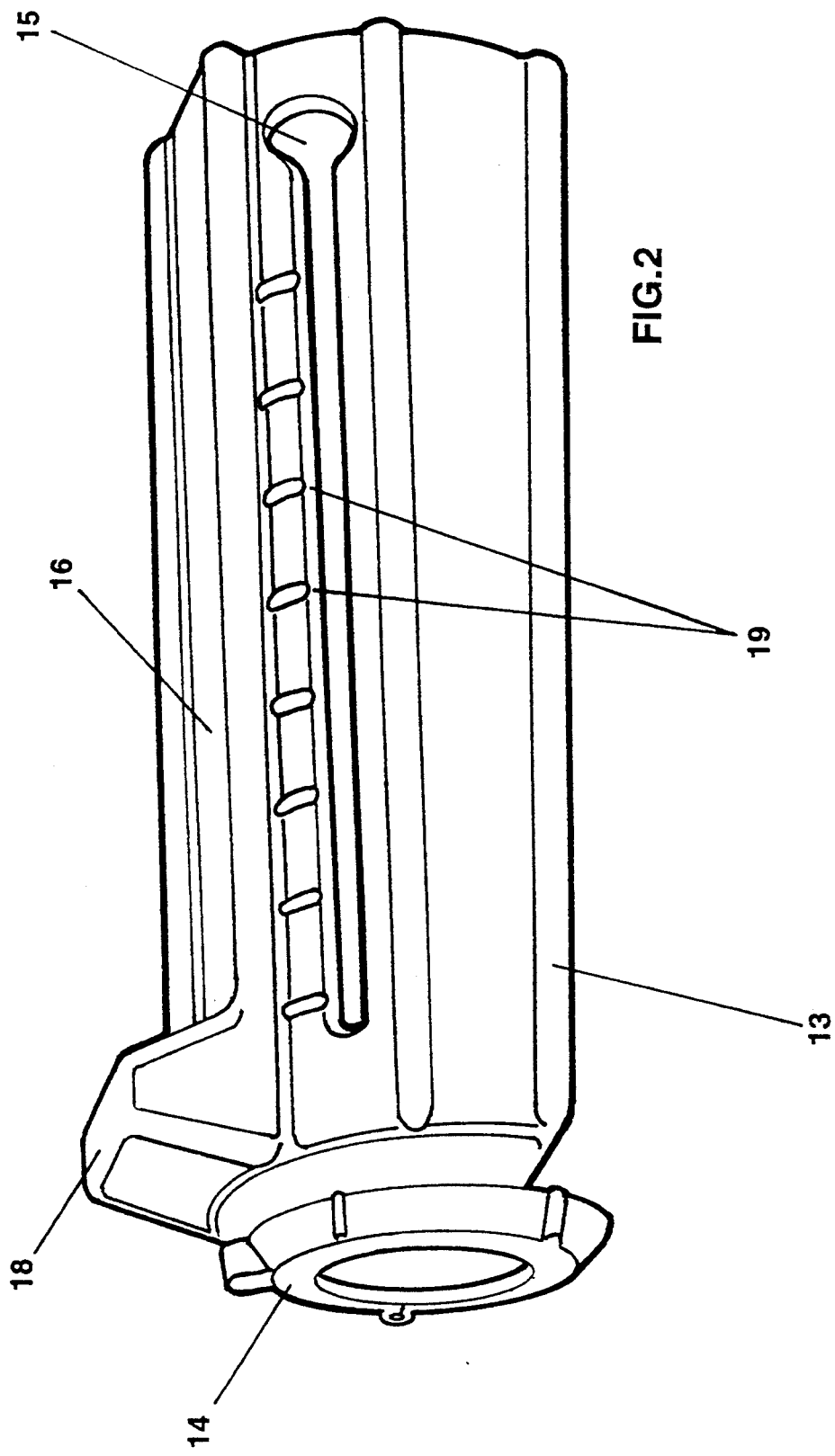
FIG. 2 is a perspective view of the invention illustrating features of the invention claimed in claims 1, 2, 3, 4, 5, 6, 8 and 9.

Referring to FIG. 2, the invention may be formed of sheet metal, thermoplastic or composites, and includes stiffening ribs 13, installation clamp 14, an enlarged opening 15 to ease installation, a flat surface 16 for temporary storage with stiffening ribs, a protrusion 18 for guiding and providing leverage to grinding tools used in lathe operations, and indexing marks 19 to indicate extension of the spindle 1.

Figure 3:
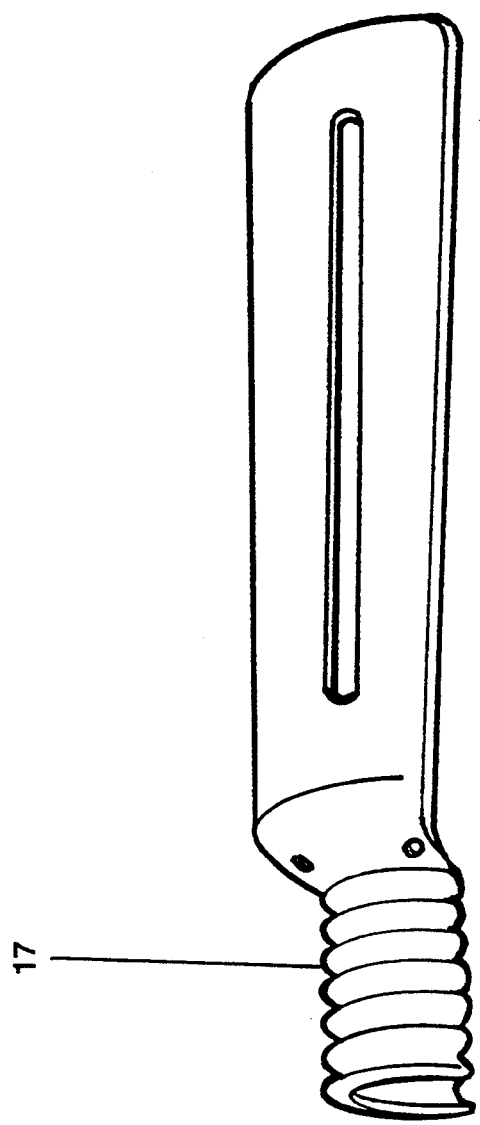
FIG. 3 is a perspective view of the invention illustrating an additional feature of the invention as claimed in claim 7.

Referring to FIG. 3, the invention is shown with an extension 17 to protect the bearings of a brake drum or rotor from contamination by shavings or grit.

I claim:

1. In an automotive brake maintenance lathe comprising a motorized mount, an axially movable lathe shaft arm extending from said motorized mount, said lathe shaft arm having a rotatable spindle portion is a non-rotatable sleeve portion, in a protective flexibly extendable bellows on said lathe shaft arm, the improvement comprising:

a substantially rigid protective shield with an at least partial generally cylindrical cross-section attached to the non-rotating sleeve portion of the shaft arm so as to move axially with the operating of the lathe and extend over the bellows, whereby the bellows may be protected from impingement from a grinding wheel as recommended in the final surfacing of brake drums and discs.

2. The shield of claim 1 further comprising a guide slot in which a guide pin is inserted so as to maintain the shield in its radial orientation during operation 3. The shield of claim 1 further comprising of ribs integrally molded parallel to the axis of the shield and the axis of the lathe so as to stiffen the shield structurally and enhance its resistance to damage by a grinding wheel.

4. The shield of claim 1 wherein a portion of the protective shield non-rotatable is attached to the sleeve by means of a clamp to facilitate installation and/or replacement.

5. The shield of claim 3 having a slot with an enlarged opening at the end of the slot nearest the machine and furthest from the end of the shaft to facilitate rotation of the shield when required for certain operations.

6. The shield of claim 3 having a flat surface and retaining ribs molded into the uppermost cross-section to provide momentary storage for hand tools used in the operation of the lathe.

7. The shield of claim 3 having an extension which protrudes into the brake drum or rotor being operated on by the lathe to protect the bearing in the brake drum or rotor from contamination by shaving or grit.

8. The shield of claim 3 having a protrusion which provides a fulcrum or rest to support a grinding machine.

9. The shield of claim 2 having markings along the guide slot in equal increments to aid in maintaining the repeatability of the operation.

* * * * *